Feb. 9, 1960 A. B. LARSON 2,924,427

PORTABLE RAMP

Filed July 30, 1956

INVENTOR

ALISON B. LARSON

BY Robert M. Dunning

ATTORNEY

United States Patent Office 2,924,427

Patented Feb. 9, 1960

2,924,427

PORTABLE RAMP

Alison B. Larson, St. Paul, Minn.

Application July 30, 1956, Serial No. 600,746

1 Claim. (Cl. 254—88)

This invention relates to an improvement in a portable ramp independently movable to a single relative right and left wheel side of a vehicle for raising the relative corner thereof when the wheel of a vehicle is mounted thereupon. More particularly, this application concerns a portable ramp and provides an improved rocking arrangement over that disclosed in my co-pending application, Serial No. 499,007 now abandoned.

As indicated in the previously mentioned application, one wheel ramps for raising any one or any number of the four wheels of an automobile have been subject to creeping and are not applicable to aiding and assisting in usage as a truck for conveying heavy objects, such as may be required in a garage. The single wheel ramp, described in my co-pending application, presents a novel and cooperative arrangement facilitating garage work. However, there is still found to be a need for improving upon the rocking action of the structure disclosed therein.

Accordingly, it is an object of this improvement to provide a ramp form auto jack independently movable to a single relative right and left wheel side of a vehicle for raising the relative corner thereof with the ramp trackway in a tipped and balanced relationship obtained through the operation of a rocker resting on a platform pivotally hinged at a point intermediate the ends of the ramp trackway.

Another object of this improvement is to provide an independently movable ramp jack relative to a single vehicle wheel and having an inclined and horizontal platform pivotally mounted upon a substantially centrally positioned rocker platform.

Further objects and advantages will be apparent from the following description of the accompanying drawings wherein.

In the description of the several views, like parts will be similarly indicated.

Figure 3:
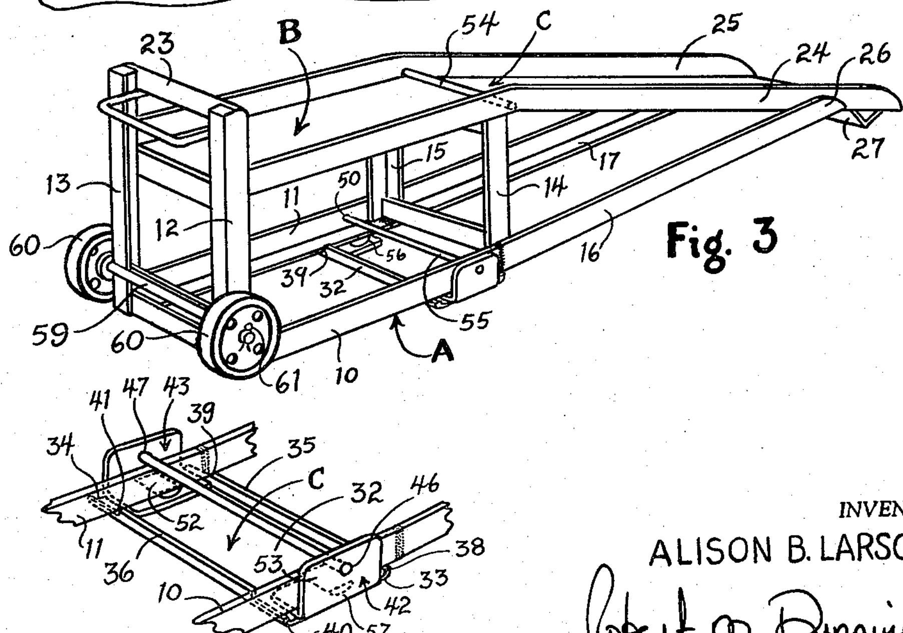
Figure 3 is a perspective of the wheeled ramp which serves as a conveyor truck and embodied in the Figures 1 and 2.

As is indicated and illustrated in the perspective view of Figure 3, taken in conjunction with the balance of the figures, the single vehicle wheel ramp and truck combination is an open frame structure A having a relatively horizontal platform B and inclined runway C with a pair of carting wheels attached to the frame in the manner as hereinafter described.

The frame A is constructed of a pair of forwardly extending narrow angle iron base bars 10 and 11. The bars 10 and 11 extend in spaced parallel relationship and have spot welded to their forward ends a pair of front vertical angle iron posts 12 and 13 which extend as uprights at an angle perpendicular to the bars 10 and 11, respectively. A pair of relatively shorter posts 14 and 15 are spot welded to the back end portions of the base bars 10 and 11, respectively, and extend in perpendicular relationship thereto as center supporting posts for the inclined runway C and platform B. Spot welded to the ends of the base bars 10 and 11 and to the lower ends of posts 14 and 15 are another pair of angle irons serving as base bars 16 and 17. These angle iron base bars 16 and 17 extend rearwardly and upwardly at angles slightly tangential to the base bars 10 and 11 and the relatively attached post ends 14 and 15, respectively. As indicated, the junctures of the post ends 12 and 13, 14 and 15, with the base bars 10 and 11, and 16 and 17 are welded or brazed along their meeting edges to join these parts solidly together.

The inclined runway C is a flat plate 20 up which a tired vehicle wheel 21 is rolled and the flat form B is a relatively level plate 22 upon which the tired vehicle wheel 21 comes to rest against a forward stop bar 23, to raise the one wheel side of the vehicle above the level of a floor surface, or the ground. As indicated, the structure herein disclosed can be used with one wheel alone. However, the preferable use is in pairs in order to raise one side of a vehicle and/or the front or rear end of a vehicle simultaneously. The forward posts 12 and 13 extend upwardly at a higher level than the plate 22 and the posts 14 and 15 to provide a pair of relatively raised end members to which the stop bar 23 is spot welded. In addition, the relative sides of the inclined plate 20 and forward resting platform or plate 22 are provided on each side with guide or guard flanges 24 and 25 to protect the wheel and tire 21 from running on the sides of runway C and platform B.

Figure 1:
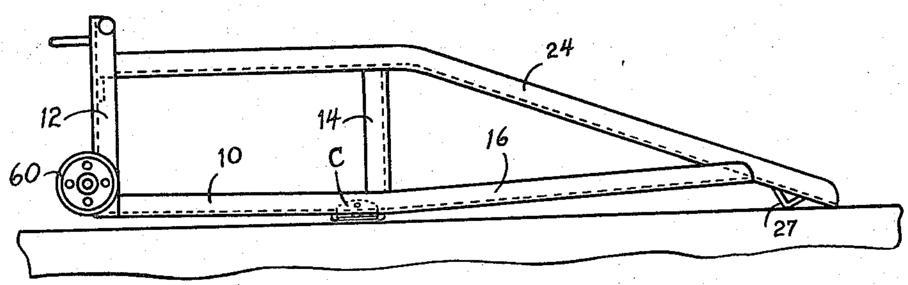
Figure 1 is a side elevation illustrating the ramp incline in balanced position for running a vehicle wheel thereupon and the relatively horizontal ramp platform in a raised position on the rocker.
Figure 2:
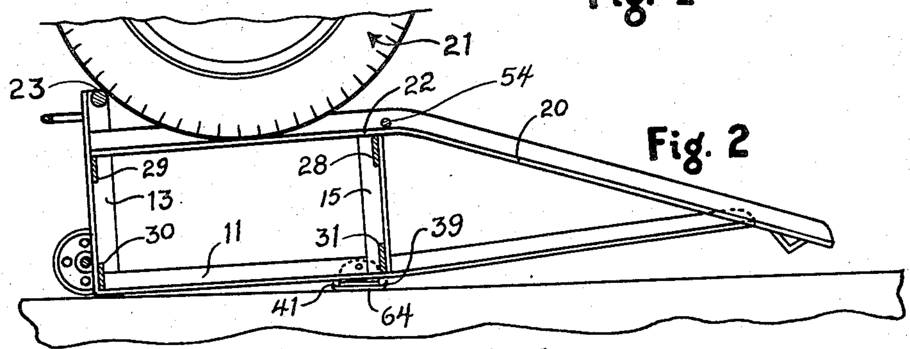
Figure 2 is a sectional side view illustrating the ramp platform in loaded balance and the ramp incline off balance.

The platform B and runway C are formed of light sheet metal plate material which is welded or brazed along the juncture or interfitting edges engaging against posts 12 and 13, to the tops of posts 14 and 15 and at the points 26 where the vertical flanges of right angular base bars 16 and 17 overlap the guide flanges 24 and 25, respectively. Welded or otherwise secured transversely of the bottom of runway portion 20, is a short piece of angle iron 27 which is secured beneath the plate 20 at the lower inclined end thereof so that its relatively sharp cornered apex normally rests on a floor surface when the ramp is in an unloaded condition and is raised from a floor surface when the ramp is loaded, for example, in the manner as shown in Figure 2. An additional reinforcing cross bar 28 is welded between the posts 14 and 15 flush with the top edge thereof and in reinforcing relationship to the bottom of the ramp platform or plate section 22. An additional reinforcing bar 29 is welded to and extends between the posts 12 and 13, and underneath the front end of plate 22, to reinforce and support the same under those conditions. Supplemental tie bars 30 and 31 are welded near the base of the posts 12 and 13 and posts 14 and 15 to reinforce the frame A and also prevent spreading of the base bars and posts, as described, under loaded conditions.

Figure 4:
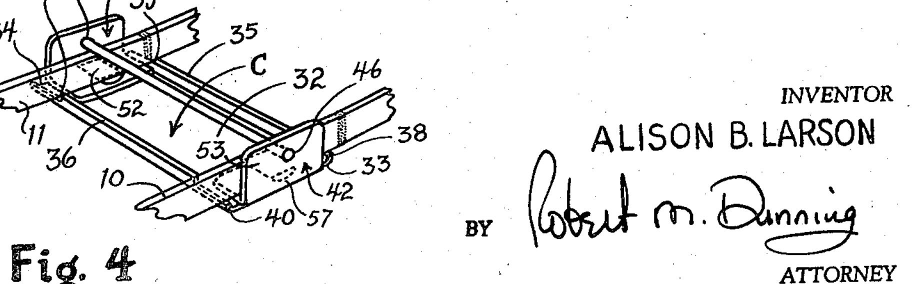
Figure 4 is a partial perspective of the ramp frame and the rocker platform embodied in this disclosure.

Slightly forwardly of the posts 14 and 15 and adjacent the rear ends of base bars 10 and 11, there is provided a pivotally mounted supporting platform C. The platform C is a relatively U-shaped structure having a flat center section 32 having its relative ends 33 and 34 underlying the horizontal sections of the angle irons 10 and 11, respectively, in spaced relationship thereto to provide a rocking action therewith in the manner as hereinafter described. As disclosed and more particularly pointed out in detail in Figure 4, the platform C extends across the width of the ramp, with the center section of the plate 32 having its relative edges 35 and 36 turned up at right angles to the plane of the plate 32. The end sections of the flange 35 are cut away at 38 and 39, to a width which is equal to the width of the horizontal portions of the base bars 10 and 11. The upstanding flange 36 is likewise cut away at its end portions 40 and 41 to an extent which is at least equal to the width of the horizontally extending flange portions of the angular base bars 10 and 11. There is spot welded to the ends 33 and 34 a pair of angle irons 42 and 43. The horizontal sides of the angle irons 42 and 43 are spot welded to the plate 32 between the cut out sections 38 and 40 and 39 and 41, respectively. The vertically extending sides of angle irons 42 and 43 are provided with relatively centered apertures 46 and 47.

Before mounting the platform C under the frame base bars 10 and 11, suitable apertures are provided in the vertical sides thereof, as illustrated at 50 in the vertical side of base bar 11, a similar aperture (not shown) being provided in the vertical portion of base bar 10. Centered with respect to the apertures as represented by 50, are a pair of circular sided plates 52 and 53 spot welded underneath the relative horizontally extending sides of angle irons 11 and 10, respectively. Having provided these structural arrangements, the platform C is positioned under the bars 10 and 11 with the apertures 46 and 47 in plates 42 and 43 aligned with the apertures in the frame base bars 10 and 11, as described. With each of the apertures 46 and 47 in the structure of platform C, and the apertures in the ramp frame structure, as represented by 50, in proper alignment, a rod element 55, or suitable bolt and nut means, is mounted therethrough and pivotally attaches the ramp frame in a rocking relationship to the platform C. When the platform C is secured in this position to the ramp frame A, the convex surfaces 56 and 57 of plate elements 52 and 53, spot welded to the horizontally extending portions of base bars 11 and 10, respectively, rest in a rocking relationship upon the upper surfaces of the relative horizontally extending flanges of the angle iron elements 43 and 42, respectively.

There is cemented to the under side of plate 32 a resilient pad 64 of synthetic rubber or rubbery material, as neoprene, which serves with the angle iron 27 to hold the ramp stationary while the wheel of a vehicle is driven up the ramp and onto the platform. Further, this pivotally mounted supporting structure in combination with the juncture of the post ends 12 and 13 with base bars 10 and 11, respectively, serve to hold the ramp from creeping in a loaded condition. As will be apparent from the above description, the supporting structure C remains relatively stationary while the ramp frame A is rocked from a position with the incline at rest, on a floor surface, to the incline being in a raised position just after the single wheel weight passes the juncture of the incline runway 20, with and onto, the resting platform 22. The relative incline side of the ramp frame A being of longer dimension and heavier weight normally tends to keep the incline down and the platform, upon which a wheel comes to rest, in a raised position. That is, as the relative center weight of the wheel 21 rolls just past the center posts 14 and 15, onto plate 22, and over a relatively adjacent vertically centered line, in a plane of alignment with the center of elements 52 and 53, the platform B and forward portion of the frame A rocks down, to lift the inclined portion C and hold the vehicle wheel in a relatively permanently jacked-up position. As shown in Figure 2, the frame A, in a loaded condition, is tipped forwardly with the plate 22 inclined slightly downwardly toward the front posts 23, to more positively insure the retention of the vehicle wheel upon the ramp, even without the setting of brakes. A safety rod or bar 54 is spot welded between flanges 24 and 25 to lay over the end of platform 22 adjacent the juncture of plate 22 with incline runway 20. This rod 54 prevents a vehicle wheel from freely rolling back off the ramp platform under normal circumstances.

To increase the practical usefulness of the ramp A, with the platform B and runway C, there is welded across the front of posts 12 and 13 a rod or shaft 59. Upon the ends of the shaft 33 are mounted a pair of wheels or rollers 60, held by suitable cotter pins 61, to provide for wheeling the ramp structure about, with or without its being loaded and used as a wheelbarrow. The bar 59 is spot welded to the posts 12 and 13 at a point which permits the use of wheels 60, of a suitable diameter, that are raised about one-sixteenth and not over one-eighth inch above the plane of the lower surface of the base bars 10 and 11.

In accordance with the patent statutes, I have described the principles of construction and operation of my portable ramp, and while I have endeavored to set forth the best embodiment thereof, I desire to have it understood that obvious changes may be made within the scope of the following claim without departing from the spirit of my invention.

I claim:

A wheel ramp for use upon a supporting surface, the ramp including an elongated rigid frame of unitary construction having an elongated wheel trackway fixedly mounted thereon, said wheel track including an inclined portion inclining upwardly from said supporting surface in fixed relation with said frame, and a generally level portion fixed to said frame forming a continuation of said inclined portion and forming an obtuse angle with respect thereto, a wheel abutment at the extremity of said generally level portion, and pivotal U-shaped supporting means intermediate the ends of said trackway on said frame and over which the wheel moves in traversing said trackway for engaging the supporting surface and holding one end of said frame slightly above said supporting surface, and roller means mounted to said frame at a location underlying said wheel abutment but at an elevation such that the lower peripheral portion of said roller means will be above said supporting surface prior to a wheel passing onto said inclined portion, whereby said frame and track will rock upon said supporting means intermediate the ends of said trackway on said frame as said wheel passes over said last named means.

References Cited in the file of this patent

UNITED STATES PATENTS

| | | |
|---|---|---|
| 808,208 | Maxwell | Dec. 26, 1905 |
| 1,477,332 | Elzey | Dec. 11, 1923 |
| 1,566,427 | Reneau | Dec. 22, 1925 |
| 1,569,469 | Elzey | Jan. 12, 1926 |
| 2,279,464 | Jackson | Apr. 14, 1942 |

FOREIGN PATENTS

| | | |
|---|---|---|
| 162,885 | Australia | Jan. 20, 1955 |
| 490,565 | Italy | Feb. 13, 1954 |